United States Patent [19]
Turk

[11] 3,847,560

[45] Nov. 12, 1974

[54] CORROSION RESISTANT METALLIC MULTILAYER STRUCTURE

[75] Inventor: Charles D. Turk, Norwood, Mass.

[73] Assignee: Texas Instruments Incorporated, Dallas, Tex.

[22] Filed: July 30, 1969

[21] Appl. No.: 846,132

[52] U.S. Cl. .................................. 29/196.3, 29/199
[51] Int. Cl... B32b 15/00, B32b 15/18, B32b 15/20
[58] Field of Search ..................... 29/183.5, 196.3

[56] References Cited
UNITED STATES PATENTS

| | | | |
|---|---|---|---|
| 1,949,623 | 3/1934 | Quarnstrom | 29/196.3 |
| 2,474,038 | 6/1949 | Davignon | 29/196.3 |
| 2,845,698 | 8/1958 | Giovannucci et al. | 29/196.3 X |
| 3,165,828 | 1/1965 | Kennedy | 29/196.3 X |
| 3,212,865 | 10/1965 | Miller | 29/196.3 |
| 3,298,803 | 1/1967 | Ulam | 29/196.3 |
| 3,555,169 | 1/1971 | Miller | 29/196.3 X |

FOREIGN PATENTS OR APPLICATIONS

| | | | |
|---|---|---|---|
| 1,367,683 | 6/1964 | France | 29/196.3 |

Primary Examiner—A. B. Curtis
Attorney, Agent, or Firm—Harold Levine; John A. Haug; James P. McAndrews

[57] ABSTRACT

A corrosion resistant laminated metallic structure is disclosed. A plurality of metallurgically bonded metallic layers are supported on a core to be protected. The metallurgically bonded layers include a protective inner layer, a protective outer layer, and an intermediate layer. The intermediate layer has a greater electrochemical reactivity than either the inner layer or the outer layer and is adapted to sacrificially corrode in the event of a disruption of the structural integrity of the outer protective layer so as to substantially delay corrosion of the inner and outer protective layers.

2 Claims, 5 Drawing Figures

PATENTED NOV 12 1974 3,847,560

INVENTOR,
Charles D. Turk,
BY
Gerald B. Epstein  Att'y.

CORROSION RESISTANT METALLIC MULTILAYER STRUCTURE

The present invention relates generally to corrosion-resistant structures and in particular is directed to improved composite corrosion-resistant laminated metallic structures.

Various types of multiple laminated metallic structures have been developed in recent years in order to efficiently utilize the advantageous properties of the various matarials comprising the laminated structure, while limiting the effects of the undesired properties. For example, a structure may be provided, including a core material occupying the major weight and thickness of the structure, fabricated of a relatively low cost, high strength material, and additional relatively thin layers of more expensive material, which have other desired properties, such as corrosion resistance solderability, high conductivity, etc., so as to provide a composite material, having various advantages of each of the separate materials, while minimizing associated disadvantages. Frequently, composite metallic structures are desired in which the core material is to be protected against corrosion. In certain of such instances, an appropriate core material may be provided with a coating of zinc, for example, in order to protect the core against corrosion, thereby protecting the underlying core material. Similarly, core materials susceptible to corrosive effects may be protected with an outer protective coating of a relatively corrosion-resistant material, such as stainless steel, and quite satisfactory results in such instances, have been achieved.

However, one problem which may occur in the latter situation results from the relatively delicate nature of the stainless steel coating, which is often relatively thin for economic reasons, as well as for facilitating bonding procedures. Accordingly, handling of the structure or subsequent forming operations can easily result in a scratch or abrasion in the coating and such a disturbance or physical discontinuity in the structural integrity of the stainless steel coating may expose the underlying core material. In addition, various surface defects, such as pinholes, may occur in the stainless steel coating, exposing the underlying core material. In such instances, catastrophic corrosion of the underlying core material being protected may result due to the differences in the relative electrochemical reactivities of the core material and the protective coating. In the presence of a corrosive medium, the relatively highly reactive core material in contact with the less reactive protective coating may catastrophically corrode at an extremely rapid rate, since the core would be anodic with respect to the coating, resulting in a structure subject to rapid deterioration. Such an effect, of course, is particularly disastrous when the material is being utilized as a structural support member, a fluid carrying receptacle, etc.

Although various solutions have been proposed, problems, such as improper deposition of the protective coating resulting in pinholes, as well as the presence of the delicate and fragile protective coating often requiring elaborate handling procedures in order to prevent surface scratches, remain prevelent. One proposal for curtailing the effects, resulting from a disruption in the physical integrity of such an outer protective coating, has involved an attempt to provide an interliner of a relatively nonreactive material intermediate the outer protective layer and the core material. However, such an approach has suffered from certain deficiencies and has failed to protect the core material against potentially destructive corrosive effects in the event of a physical discontinuity, such as a scratch, a pinhole, etc., in the outer protective layer, since the core material remains anodic with respect to the interliner and the protective layer.

Accordingly, it is an object of the present invention to provide an improved, composite, corrosion-resistant laminated structure.

It is another object of the present invention to provide an improved, composite, corrosion-resistant laminated metallic structure in which substantially improved corrosion protection is afforded the core material.

It is still another object of the present invention to provide a composite corrosion-resistant, laminated metallic structure in which deleterious corrosive effects resulting subsequent to a disturbance in the physical integrity of an exposed protective coating are substantially limited.

It is a further object of the present invention to provide an improved, composite, corrosion-resistant laminated metallic structure which is readily deformaable into a desired shape, which is economical to fabricate, and which is extremely durable in use.

Various additional objects and advantages of the present invention will be readily apparent from the following detailed description and accompanying drawings wherein.

It should be noted that the foregoing drawings are not drawn to scale but are exaggerated in dimension in order to depict various features of the present invention with increased clarity.

Figure 1:
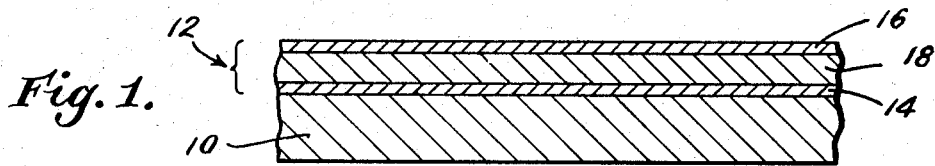
FIG. 1 is a fragmentary sectional view through a composite metallic structure in accordance with the present invention.

Referring generally to the drawings and particularly to FIG. 1, a composite corrosion-resistant structure is illustrated, including a base layer or core 10 and a multi-layer metallic laminate 12 formed of a plurality of metallurgically bonded layers bonded to at least one surface of the core. The use of the term metallurgically bonded as used herein, is intended to refer to solid-phase bonding techniques in which two or more metals are bonded together without the formation between the metals of a liquid-phase. Typical solid-phase bonding processes and techniques are set forth in U.S. Pat. Nos. 2,691,815 and 2,753,623, assigned to the assignee of the present invention.

The laminate 12 generally includes an inner protective metallic layer 14 adjacent a surface of the core, an outer protective metallic layer 16, and an intermediate metallic layer 18, disposed intermediate the inner and outer layers. In accordance with an important feature of the present invention, the intermediate layer 18 comprises a preselected metallic material which has a greater electrochemical reactivity and is less noble than either of the inner and outer protective layers 14 and 16, so as to severely limit the effects of corrosion in the event of a physical discontinuity in the outer protective layer 16. In the event of such a discontinuity in the outer protective layer 16, which may take the form of scratches, pinholes, surface pitting, or other such imperfections, caused by handling, improper deposition procedures, etc., corrosive effects which might ordinarily quickly penetrate and attack the underlying core material in conventional structures is severely limited.

More particularly, by virtue of the illustrated arrangement the intermediate layer 18, which is more electrochemically reactive than either of the layers 14, 16 is adapted to sacrificially corrode in preference to the protective layers 14, 16. This effect is particularly illustrated with regard to FIG. 2.

Figure 2:
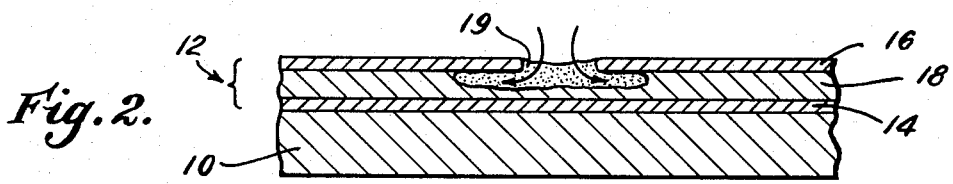
FIG. 2 is a fragmentary sectional view of a structure similar to that shown in FIG. 1, illustrating the self-limiting effects of corrosion.

FIG. 2 is generally similar to FIG. 1, illustrating the core 10 with the laminate 12 of metallurgically bonded layers 14, 16, and 18 secured on one surface of the core. However, this structure illustrates the effects of exposure to a corrosive environment in the presence of a physical discontinuity, comprising a small opening 19, in the outer protective layer 16. As shown by the stipling corrosion has partially penetrated the laminate 12 through the outer protective layer 16. More particularly, as previously explained, the intermediate layer 18 is of a preselected material which is less noble and thus more highly electrochemically reactive than either the inner protective layer 14 or the outer protective layer 16. Consequently, when the laminate 12 is exposed to corrosion, the intermediate layer 18 corrodes preferentially with regard to the more noble material comprising the layers 14 and 16, since the intermediate layer 18 is anodic with respect to the layers 14 and 16. In this regard, it has been found, that if a portion of relatively noble material is exposed to a corrosive atmosphere without the presence of a relatively highly reactive material, the former corrodes at a predetermined rate. However, when the more reactive material is also present and in contact with less reactive material, such as the layers 14 and 16, the layers 14 and 16 corrode at a significantly slower rate, while the layer 18 corrodes sacrificially with respect to layers 14 and 16. Since the layer 18 corrodes preferentially with regard to the layers 14 and 16, the protection afforded the core material by layers 14 and 16 is retained.

In addition, further protection of the core material is provided by the particular physical arrangement of the layer 18 with respect to layers 14 and 16. More particularly, as corrosion proceeds from the exposed surface of laminate 12 through layer 16 the direction of the corrosion is such that layer 18 corrodes sacrificially with respect to layer 16. Similarly, as the corrosion proceeds through layer 18 toward layer 14, the direction of the corrosion reaction necessarily reverses due to the change in electrochemical potential between layer 18 and layer 14, the latter comprising a more noble material than layer 18. Thus, since the layer 18 corrodes sacrificially with respect to both layer 14 and layer 16 and in view of the reversal of electrochemical potential the corrosion proceeds generally laterally through the layer 18, as illustrated by the arrows in FIG. 2, without significantly affecting protective layers 14 and 16. Thus, it may be readily seen, that the resultant composite, laminated, metallic structure in accordance with the present invention has an inherent corrosion limiting feature, since the intermediate layer 18 must be virtually completely destroyed prior to the occurence of significant corrosion affecting the protective layers 14 and 16.

In order to provide additional corrosion protection and further increased durability, it is generally desirable to arrange the intermediate layer 18 to have a substantially greater thickness than the layers 14 and 16. By virtue of such an arrangement a greater volume of corrosion susceptible material is made available for preferential corrosion with respect to layers 14 and 16 thereby increasing the overall lifetime of the composite structure. The layers 14 and 16 may be relatively thin and in certain instances may be only of a sufficient thickness to maintain their separate respective metallurgical identities, although in practice a somewhat greater thickness is utilized to eliminate processing difficulties. Such a configuration also provides an important economic advantage, since the intermediate layer 18 is generally fabricated of a substantially less expensive material than the protective layers 14, 16. The core material 10 preferably comprises a metallic material and would ordinarily be fabricated of a relatively inexpensive material selected to provide structural strength to the composite structure and adapted to be metallurgically bonded to the laminate 12.

In fabricating a structure, such as illustrated in FIG. 1, it may be desirable to initially provide the core 10 of a preselected material, while separately fabricating the laminate 12, utilizing techniques such as described in the afore-mentioned patents. The laminate 12 then may be metallurgically bonded to a surface of the core 10, utilizing similar conventional techniques, such as described in the afore-mentioned patents.

In addition, since a feature of importance in accordance with the present invention is the presence of a substantially reactive material intermediate layers of material having a lesser electrochemical reactivity, it may be possible in certain instances to eliminate the inner protective layer 14. In such a configuration, an outer protective layer would be provided comprising a material having a relatively low electrochemical reactivity with an intermediate layer having a relatively high electrochemical reactivity directly secured between the outer protective layer and a core material which has a lower electrochemical reactivity than the intermediate layer. For example, such a structure may include a core of low carbon steel, an intermediate layer of zinc, and an outer protective layer of copper, brass, etc., with the respective materials being metallurgically bonded together to form a composite laminated structure. The resultant structure would include the self-limiting corrosion feature of the present invention, but may be somewhat less corrosionresistant than a structure, such as that illustrated in FIG. 1, for example.

Although various materials and combinations of materials may be utilized in a structure such as that illustrated in FIG. 1 a typical structure may include a core 10 comprising low carbon steel, an inner protective layer comprising stainless steel, brass, copper, etc., an intermediate layer comprising low carbon steel, zinc, manganese, etc., and an outer protective layer comprising stainless steel, copper, brass, etc., the feature of importance being the provision of an intermediate layer having a higher electrochemical reactivity (less noble) than either the inner protective layer 14 or the outer protective layer 16.

It should be apparent that the embodiment illustrated in FIG. 1 is particularly adapted for use in situations in which only one surface of the composite structure is to be exposed to a corrosive or potentially corrosive environment. Examples of such usage include the utilization of the composite structure as a building material, where only one surface is to be exposed to the environment, the use of the material in forming an enclosure or receptacle in which only one surface of the enclosure is to be exposed to a corrosive medium or environment, etc.

Figure 3:
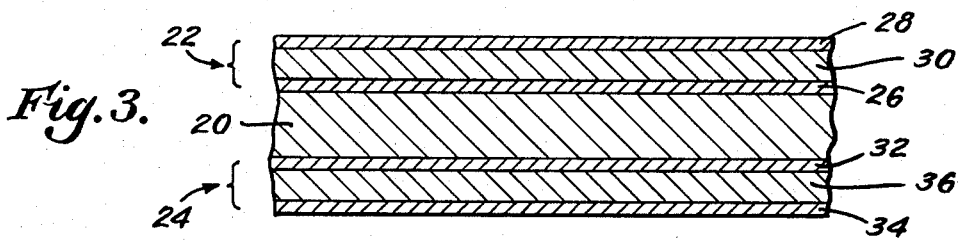
FIG. 3 is a fragmentary sectional view similar to FIG. 1 of an alternative embodiment of a composite metallic structure in accordance with the present invention.

However, in many instances, it is contemplated that a composite structure in accordance with the present invention may be employed in situations in which the opposed surfaces are to be exposed to potentially corrosive environments. Referring to FIG. 3, another embodiment of the present invention is illustrated in which corrosion protection is provided on opposite surfaces of a core material 20. As illustrated, a laminate 22 comprising a plurality of metallurgically bonded layers is bonded to the upper surface of the core 20 while a similar laminate 24 comprising a plurality of metallurgically bonded layers is bonded to the lower surface of the core 20. More particularly, the laminate 22 includes an inner protective layer 26, an outer protective layer 28 and an intermediate layer 30 disposed between the inner and outer layers. The layers 26 and 28 comprise preselected materials each having a lesser electrochemical reactivity and an associated greater nobility than the intermediate layer 30. In addition, the intermediate layer 30 preferably has a greater thickness than either of the layers 26 and 28 in order to provide a greater volume of material susceptible to sacrificial corrosion, as previously explained. Similarly, the laminate 24 includes an inner protective layer 32, an outer protective layer 34 and an intermediate layer 36, the intermediate layer 36 having a greater electrochemical reactivity and thus a lesser nobility than either of the layers 32 or 34. In addition, the intermediate layer 36 has a somewhat greater thickness than either of the layers 32, 34 in order to provide a greater volume of material susceptible to sacrificial corrosion. Thus, it may be seen that this embodiment provides essentially the same self limiting corrosion protection feature as described in connection with FIGS. 1 and 2 but the protection is provided on opposite surfaces of the core 20.

Several specific examples of composite corrosionresistant structures, such as illustrated in FIG. 3, which have been fabricated and successfully tested by exposure to a corrosive environment, comprising a salt spray for approximately two hundred hours are as follows:

EXAMPLE 1

A core is provided of 1006, AK Steel which is composed of approximately 99.5 percent iron, approximately 0.40 percent to 0.25 percent manganese, approximately 0.40 percent phosphorous, approximately 0.050 percent sulphur, and a maximum of approximately 0.08 percent carbon. The core is in the form of a generally flat sheet having a thickness of between approximately 0.0123 to 0.0129 inches. Substantially identical metallurgically bonded laminates are metallurgically bonded to opposed surfaces of the core, each laminate including an inner layer, an intermediate layer, and an outer layer. The inner and outer layers each comprise approximately 20 percent of the thickness of the laminate and the intermediate layer comprises approximately 60 percent of the thickness of the laminate. The inner and outer layers are each between approximately 0.000048 to 0.000216 inches in thickness and the intermediate layer is between approximately 0.000560 and 0.000896 inches in thickness. The inner and outer layers are of brass comprising approximately 90 percent copper and 10 percent zinc, while the intermediate layer comprises 1006 AK Steel, as described above. The core comprises approximately 90 percent of the total thickness of the composite structure, while each of the laminates respectively comprises approximately 5 percent of the total thickness of the composite structure.

EXAMPLE 2

A core is provided of 1006 AK Steel substantially identical to that described in Example 1, but having a thickness of between approximately 0.0127 to 0.0134 inches. Substantially identical metallurgically bonded laminates are metallurgically bonded to opposed surfaces of the core, each laminate including an inner layer, an outer layer, and an intermediate layer. The inner and outer layers each comprise approximately 5 percent of the thickness of the laminate, while the intermediate layer comprises approximately 90 percent of the thickness of the laminate. The inner and outer layers are each between approximately 0.000024 to 0.000112 inches in thickness and the intermediate layer is between approximately 0.000704 to 0.001264 inches in thickness. The inner and outer layers are of brass comprising approximately 90 percent copper and 10 percent zinc, while the intermediate layer comprises 1006 AK Steel, as described in Example 1. The core comprises approximately 90 percent of the total thickness of the composite structure, while each of the laminates respectively comprises approximately 5 percent of the total thickness of the composite structure.

Figure 4:
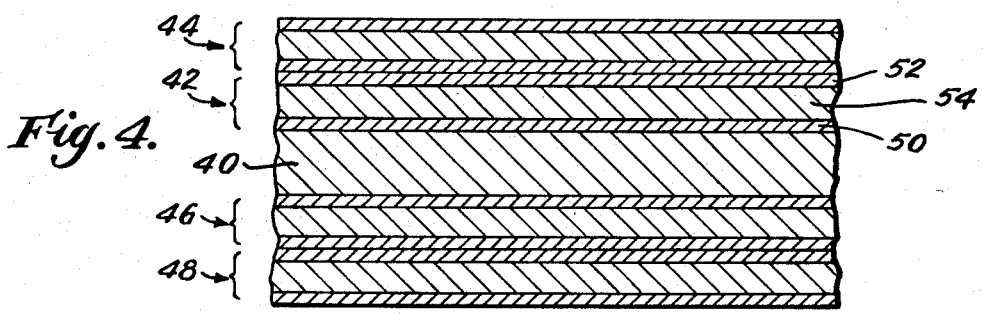
FIG. 4 is a fragmentary sectional view similar to FIG. 1 of another alternate embodiment of a composite metallic structure in accordance with the present invention.

Referring now to FIG. 4, an alternative embodiment of the present invention is illustrated. In this embodiment a plurality of metallurgically bonded metallic laminates similar to the laminate 12 are respectively secured to each other on opposed surfaces of a core material in order to provide further increased corrosion protection by providing multiple corrosion barriers. In achieving this result, a repetitive or iterative pattern of metallurgically bonded layers is defined, including a plurality of corrosion barriers to protect the core, each providing the reversal of corrosive action and sacrificial corrosion, as explained in connection with FIG. 2. In this connection, a core material 40 is provided which preferably comprises an inexpensive metallic material, such as low carbon steel. In the embodiment illustrated, a pair of metallurgically bonded metallic laminates 42 and 44 are secured to the upper surface of the core 40, and another pair of metallurgically bonded metallic laminates 46 and 48 are secured to the opposite lower surface of the core. Each of the laminates 42, 44 and 46, 48 is generally similar to the laminate 12, and the laminates are preferably metallurgically bonded to each other, as well as being metallurgically bonded to the respective surfaces of the core 40. More particularly, the structure 42 includes an inner protective layer 50, an outer protective layer 52, and an intermediate layer 54, the inner and outer protective layers being fabricated of metallic materials which are less electrochemically reactive, i.e., have a higher nobility than the intermediate layer 54. Accordingly, the intermediate layer 54 is adapted to sacrificially corrode in the event of a physical discontinuity in the outer protective layer so as to protect the inner and outer layers in the manner previously explained in detail. The laminates 44, 46, and 48 preferably are substantialy identical to the laminate 42 in that each includes an inner and outer protective layer, with an intermediate layer arranged between the inner and outer protective layers of a material having a higher electrochemical reactivity and a lower nobility than either the inner or outer protective layer. Although only two of such laminates are shown secured to each opposed surface of the core 40, additional similar laminates may be provided in order to obtain increased corrosion protection. The feature of significance in this regard is the repetitive nature of each of the laminates forming an iterative pattern including inner and outer protective layers with an intermediate layer, having a greater electrochemical reactivity and a lesser nobility than either of the inner and outer protective layers in order to achieve the desired self-limiting corrosion resistance.

Typically, the inner and outer protective layers of each of these structures may be fabricated of a material such as brass, copper, or stainless steel, while the associated intermediate layers may be fabricated of a material such as low carbon steel, zinc, manganese, or other such metallic materials, having a greater electrochemical reactivity and, thus, a lesser nobility than the inner and outer protective layers. In this regard, it may be noted that since a feature of significance in obtaining the self-limiting corrosion protection in accordance with the present invention is the disposition of a layer having a higher electrochemical reactivity than the inner and outer layers numerous additional structural relationships are possible. For example, the inner and outer layers may comprise brass fabricated of approximately 85 percent copper and 15 percent zinc, while the intermediate layer may comprise brass fabricated of approximately 75 percent copper and 25 percent zinc in order to achieve the desired effects. The selection of the particular materials utilized, of course, depends upon the ultimate use to which the structure is to be put and the properties which are desired. For example, in those instances where solderability is desired, it may be important to have an outer protective layer of a material such as copper, which is readily solderable. Similarly, the choice of materials may be partially dictated by economic reasons.

Figure 5:
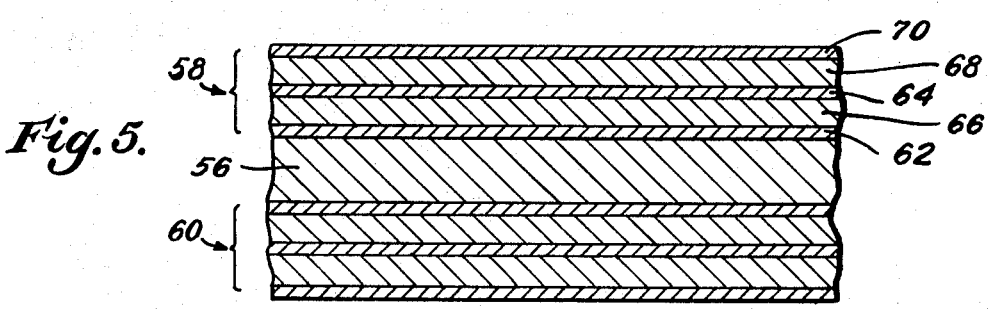
FIG. 5 is a fragmentary sectional view similar to FIG. 1 of still another alternate embodiment of a composite metallic structure in accordance with the present invention.

Still another embodiment of the present invention is illustrated in FIG. 5 in which a somewhat similar metallic laminate is disposed on opposed surfaces of a core. More particularly, in this embodiment a suitable core 56 is provided preferably fabricated of a relatively low cost metallic material such as low carbon steel. Metallic laminates 58 and 60, each including a plurality of metallurgically bonded layers are respectively secured to the opposed upper and lower surfaces of the core 56. The laminates 58 and 60 are preferably metallurgically bonded to the associated surfaces of the core 56, as previously described. In addition, laminates 58 and 60 are each arranged in a predetermined iterative pattern, although for the sake of simplicity only the laminate 58 is described in detail, since the laminate 60 preferably is substantially identical. The laminate 58 is formed of a plurality of metallic layers arranged in a preselected iterative pattern, and includes an inner protective layer 62, an outer protective layer 64, an intermediate layer 66 disposed between layers 62 and 64, another intermediate layer 68 separated from intermediate layer 66 by protective layer 64, and another outer protective layer 70. The intermediate layers 66 and 68 are fabricated of material having a greater electrochemical reactivity and hence a lesser nobility than any of the protective layers 62, 64, and 70. In this connection, it should be noted that the pattern defined by the layers comprising the laminate 58 includes an intermediate layer sandwiched between layers of material having a lesser electrochemical reactivity and thus a greater nobility than the intermediate layers. Accordingly, the effects of corrosion, such as might result subsequent to the occurrence of a physical discontinuity in one of the protective layers 62, 64, and 70 are substantially minimized since both layers 68 and 66 function essentially as sacrificial layers which corrode preferentially with respect to the layers 62, 64, and 70. In addition, the pattern of the layers comprising the laminate 58 is arranged such that a layer adapted to sacrificially corrode is disposed intermediate protective layers in order to obtain the benefits of the corrosion reversal effects, previously explained. More particularly, the illustrated embodiment is quite similar to that of FIG. 4 in which laminates 42 and 44, for example, are bonded together with a pair of sacrificial layers being provided. However, in the FIG. 5 embodiment, intermediate layers 66 and 68, which are adapted to sacrificially corrode are sandwiched between protective layers so as to achieve the advantages of the provision of a pair of layers adapted to sacrificially corrode, while eliminating the provision of one of the protective layers.

The structure illustrated in FIG. 5 may be particularly desirable in certain instances since it is somewhat more economical in that a lesser amount of material is required to fabricate the structure. If desired, the structure illustrated in FIG. 5 may be slightly modified by adding additional layers of metallic material metallurgically bonded to the laminate 58 and 60 following the illustrated iterative pattern of adjacent layers of more electrochemically reactive material and less electrochemically reactive material. The materials utilized in forming a structure such as that illustrated in FIG. 5 are generally similar to those described above. For example, the core 56 may comprise low carbon steel, while the various protective layers 62, 64, and 70 may comprise materials such as copper, brass, stainless steel, etc., and the intermediate layers 66 and 68 may comprise low carbon steel, zinc, manganese, etc., with the ultimate choice being dictated by the use requirements of the structure.

It may be also noted that the structures illustrated and described in accordance with the present invention may be fabricated in numerous desired sizes, shapes and forms. For example, for the sake of convenience, the structures have been illustrated herein in the form of relatively flat sheets. However, the structures may be readily fabricated in the form of bars, tubes, etc., and may have various desired cross-sectional configurations, being formed into rectangular, circular, or other desired shapes. In addition, metallic structures having the self-limiting corrosion protection features in accordance with the present invention may be readily deformed into desired intermediate or end products such as pipes, various types of receptacles, heater tanks, radiators, etc., and adapted for use as various types of structural elements, for carrying a variety of corrosive and noncorrosive fluids, for automotive uses, such as the replacement of conventional brass radiators, etc.

Thus, a novel composite corrosion resistant metallic structure has been described arranged such that corrosive effects are inherently self-limited by the provision of a structural arrangement, whereby a reversal of the direction of corrosion is effected so as to obtain the preferential sacrificial corrosion of a layer of metallic material provided for such purposes so as to protect additional protective layers of metallic material which remain to provide continued protection of the core material.

Various changes and modifications will be readily apparent to one skilled in the art from the foregoing description and such changes and modifications are deemed to be within the scope of the invention as set forth in the appended claims.

What is claimed is:

1. A composite corrosion-resistant laminated metallic structure consisting essentially of a core layer of metallic material of selected thickness to be protected against corrosion and at least one multilayer metallic material of relatively much smaller thickness metallurgically bonded to at least one side of said core layer to form an outer surface of said structure protecting said core layer against corrosion, said multilayer material comprising a single layer of a first metal sandwiched between and metallurgically bonded to a pair of other metal layers, said single layer of said first metal in said multlilayer material being relatively more anodic and relatively much thicker than either of said pair of other metal layers in said multilayer material.

2. A composite corrosion-resistant laminated metallic structure comprising a core layer of metallic material of selected thickness to be protected against corrosion and at least one multilayer metallic material of relatively much smaller thickness metallurgically bonded to at least one side of said core layer to form an outer surface of said structure protecting said core layer against corrosion, said multilayer material comprising a pair of layers of a first metal sandwiched alternately between and metallurgically bonded to three other metal layers, each of said pair of layers of said first metal in said multilayer material being relatively more anodic and relatively much thicker than any of said three other metal layers in said multilayer material.

* * * * *